United States Patent [19]

Revere et al.

[11] Patent Number: 4,505,303
[45] Date of Patent: Mar. 19, 1985

[54] PIPE AND INSULATOR THEREFOR

[75] Inventors: Peter W. Revere; Frank Campbell, Jr., both of Houston, Tex.

[73] Assignee: Cameron Iron Works, Inc., Houston, Tex.

[21] Appl. No.: 483,687

[22] Filed: Apr. 11, 1983

[51] Int. Cl.³ .................... F16L 9/10; F16L 9/22; F27B 9/14; F27D 3/02
[52] U.S. Cl. .................... 138/149; 138/158; 432/234
[58] Field of Search ............ 138/156, 149, 147, 158, 138/157; 432/234, 233; 24/20 CW, 20 W, 23 W, 689, 674

[56] References Cited

U.S. PATENT DOCUMENTS

| 589,903 | 9/1897 | Lysle | 138/158 |
| 2,400,512 | 5/1946 | Hurtel | 138/158 |
| 3,000,433 | 9/1961 | Kemper | 138/149 X |
| 3,781,167 | 12/1973 | Ahonen | 432/234 |
| 4,290,457 | 9/1981 | Campbell | 432/234 X |
| 4,337,034 | 6/1982 | Morgan et al. | 432/234 |

FOREIGN PATENT DOCUMENTS

2435001 2/1975 Fed. Rep. of Germany ...... 432/234

Primary Examiner—James E. Bryant, III
Attorney, Agent, or Firm—Vinson & Elkins

[57] ABSTRACT

An improved furnace support member including a hollow structural member with an insulator having segments fitting tightly on the structural member with longitudinal abutting edges interrupted by a recess, and fastening means including anchor bands secured in the segments and having tabs extending outward in the recesses, means for retaining the tabs which are deformed to secure the insulator on the structural member and insulating plugs filling the recesses.

9 Claims, 11 Drawing Figures

PIPE AND INSULATOR THEREFOR

BACKGROUND

Water cooled structural members for furnaces, such as a support member in a reheat furnace, require insulation, such as heavy duty ceramic insulation, and such insulation is sufficiently heavy so that it is preferred to be secured on the rails in short half-sections. The G. H. Ahonen U.S. Pat. No. 3,781,167 discloses an insulated type of skid rail. The P. A. Errington U.S. Pat. No. 4,071,311 discloses another example of an insulated furnace pipe.

My prior co-pending application Ser. No. 250,517, filed Apr. 2, 1981 discloses an insulator of two segments with anchor bands and uses channel clips engaging the ends of the anchor bands to secure adjacent insulator segments to the pipe.

While such insulators have all had advantages over the prior art there is still a need to provide an insulator which can be easily, quickly installed on a furnace pipe with a fastening means which stays fastened during use.

SUMMARY

The present invention relates to an hollow structural member with an improved insulator having an improved fastening means. The insulator is provided in two segments which are positioned around the hollow structural member with axially extending abutting edges interrupted by a recess. The improved fastening means includes anchor bands having tabs extending outward in the recesses and a pair of retainers, each with an opening therethrough for receiving adjacent tabs in the edge recesses and the tabs being capable of being deformed over the retainer to fasten the segments in place on the hollow structural member to be insulated.

An object of the present invention is to provide an improved hollow structural member for a reheat furnace and insulator therefor: which insulator may be quickly and easily installed on the structural member.

Another object is to provide an improved insulator of the type described which, when fastened on a structural member, will remain fastened thereon despite heavy use.

A further object is to provide an improved furnace structural member which is water cooled and minimizes heat losses into the water.

A still further object is to provide an improved insulated furnace structural member which substantially eliminates striping of the workpiece.

BRIEF DESCRIPTION OF THE DRAWINGS

These and other objects and advantages of the present invention are hereinafter set forth and described with reference to the drawings wherein.

DESCRIPTION OF THE PREFERRED EMBODIMENTS

Figure 1:
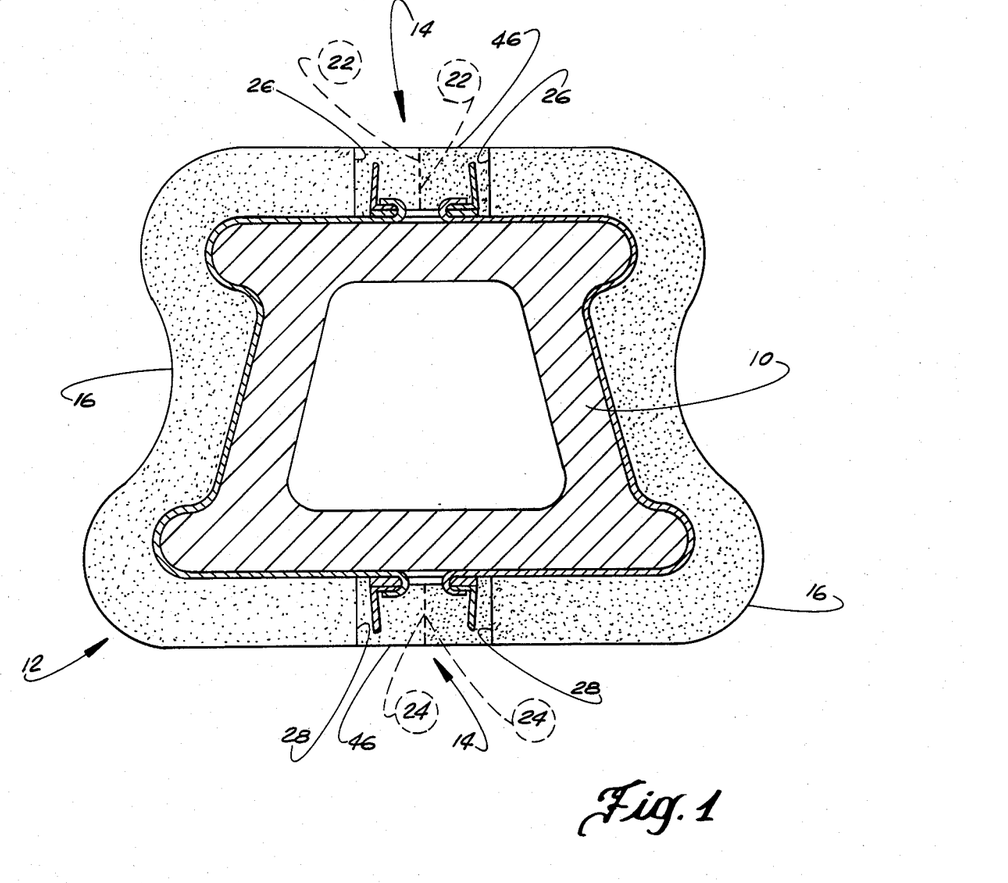
FIG. 1 is a transverse sectional view of the improved structural member and insulator of the present invention taken through the insulator to illustrate the fastening means.
Figure 2:
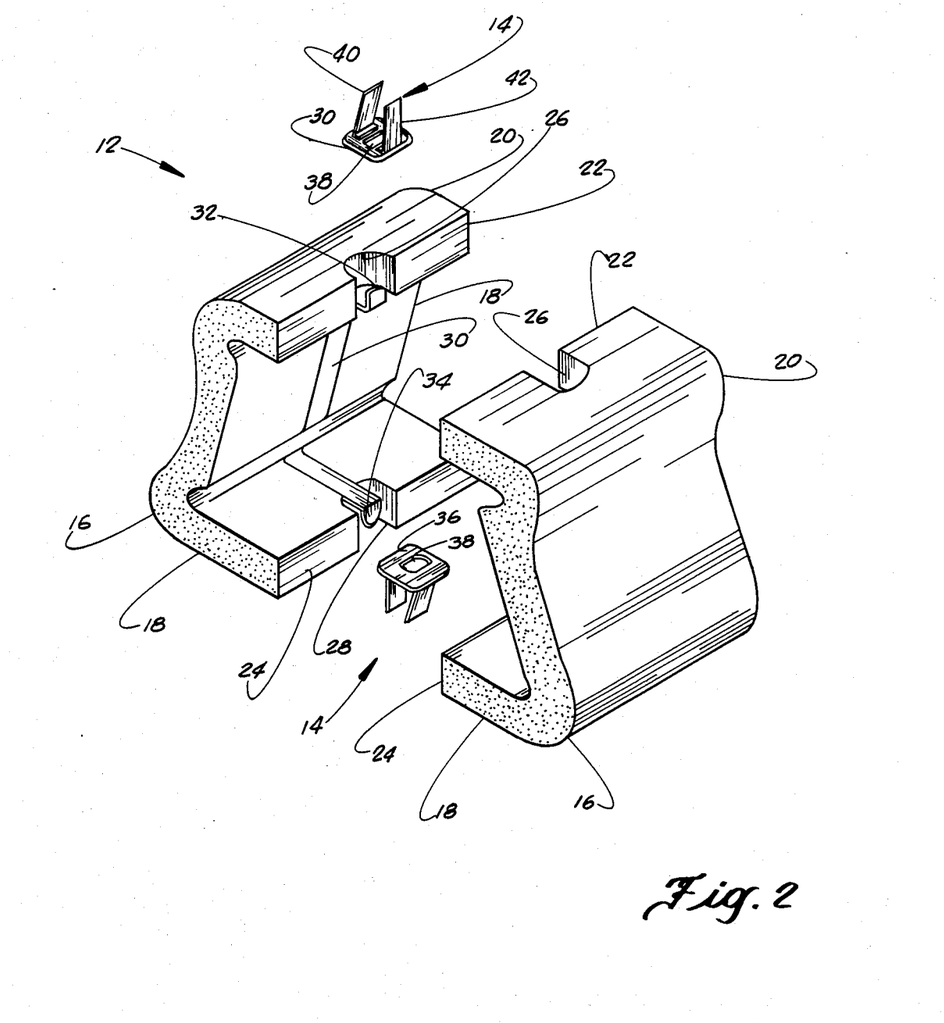
FIG. 2 is an exploded view of the improved insulator.

Member 10 shown in FIG. 1 is a truncated triangular pipe structural member for use in a reheat furnace and has improved insulator 12 fastened thereon by fastening means 14. Insulator 12 includes mating segments 16 having an internal shape to fit closely on member 10. As shown in FIG. 2 segments 16 include transverse ends 18 and 20 which are adapted to fit tightly against the transverse ends of the next insulator (not shown) on member 10 and abutting longitudinal edges 22 and 24 which are interrupted by recesses 26 and 28, respectively. Anchor bands 30 are suitably secured to segments 16, as by being integrally cast therein, and include end tabs 32 and 34 extending outward in recesses 26 and 28 as shown.

Figure 3:
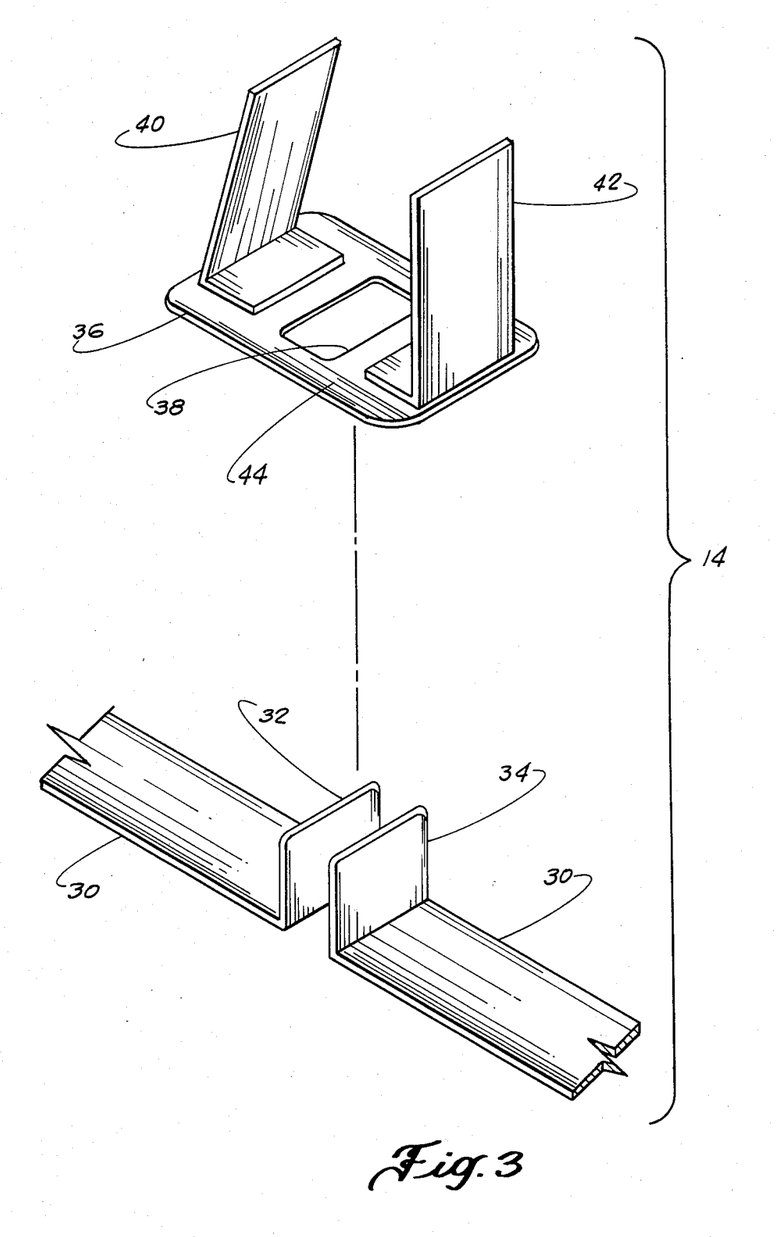
FIG. 3 is an exploded view of the improved fastening means.
Figure 4:
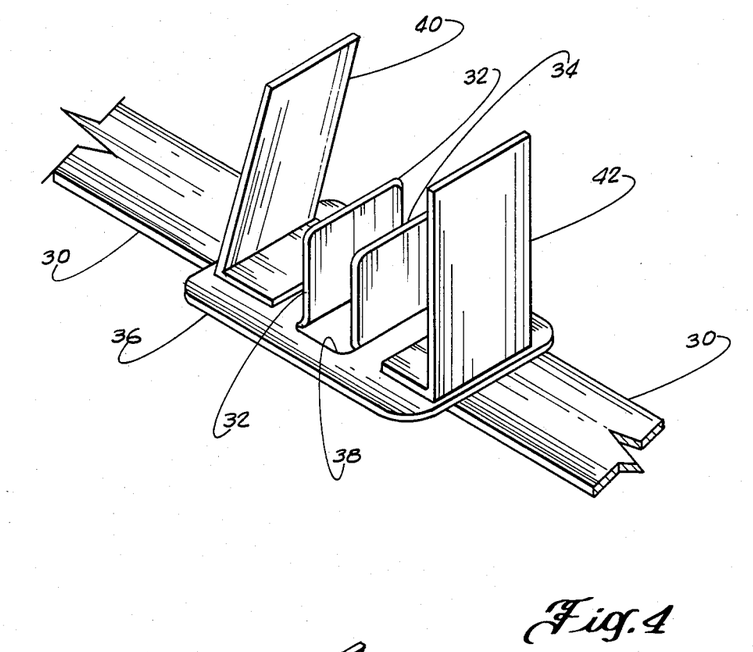
FIG. 4 is an isometric view of the improved fastening means partially assembled.
Figure 5:
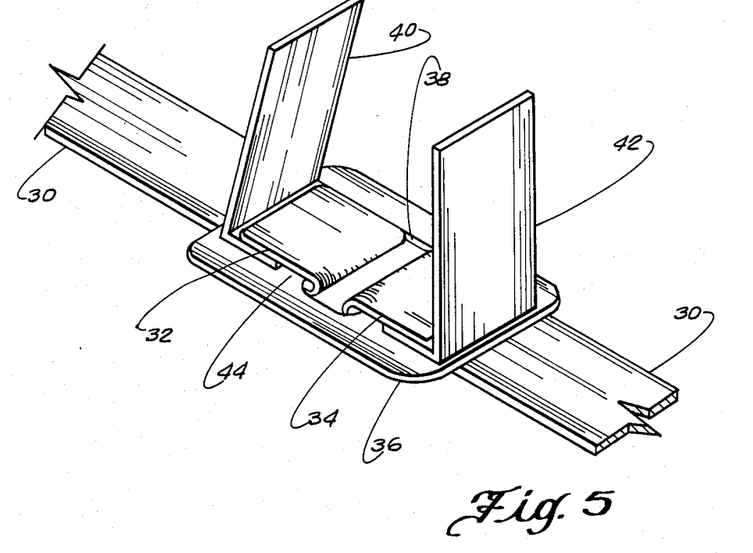
FIG. 5 is an isometric view of the fastened fastening means.

As shown in FIG. 3 fastening means 14 includes tabs 32 and 34, which can be easily deformed as hereinafter described and shown, and retainers 36. Retainer 36 includes opening or slot 38 extending through its central portion with clips 40 and 42 suitably secured, as by spot welding, to outer face 44 of retainer 36. Slot 38 is of sufficient size to receive adjacent tabs 32 and 34 therethrough as shown in FIG. 4. Fastening is complete by deforming each of tabs 32 and 34, such as by bending them downward onto face 44 of retainer 36 as shown in FIGS. 1 and 5.

Clips 40 and 42 are provided on retainers 36 to assist in retaining the plug 46 of insulating material which is suitably applied to fill recesses 26 and 28 after tabs 32 and 34 have been deformed to secure fastening means 14. Plug 46 completes the insulation of member 10 and also functions to prevent inadvertent release of fastening means 14. The bending of tabs 32 and 34 is sufficient to prevent inadvertent release of fastening means 14 and if accomplished carefully will ensure that segments 16 are held tightly against member 10.

Figure 6:
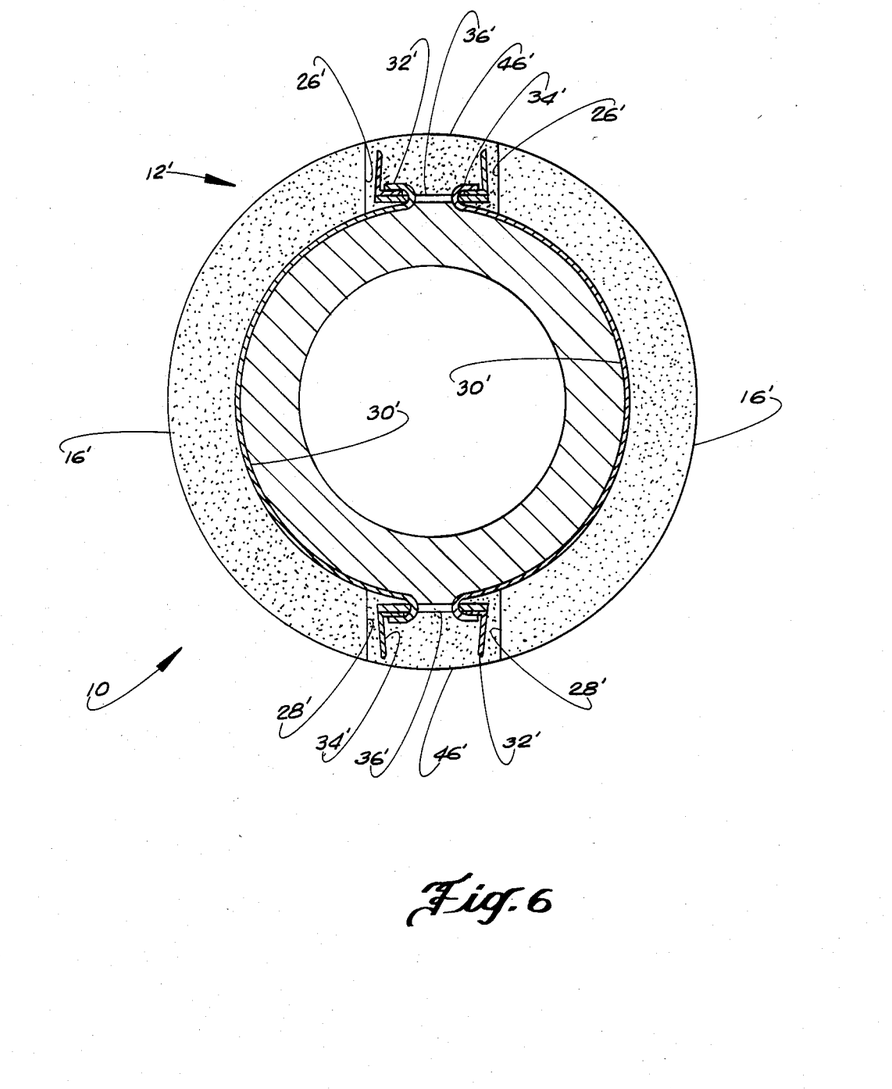
FIG. 6 is a sectional view of a modified form of improved structural member and insulator of the present invention.

In the modified form of improved insulator 12' of the present invention shown in FIG. 6 member 10' is a tubular member or pipe and segments 16' have a semi-tubular shape, as shown, with anchor bands 30' ending in tabs 32' and 34' extending outward in recesses 26' and 28' and engaging retainers 36' as shown.

Figure 7:
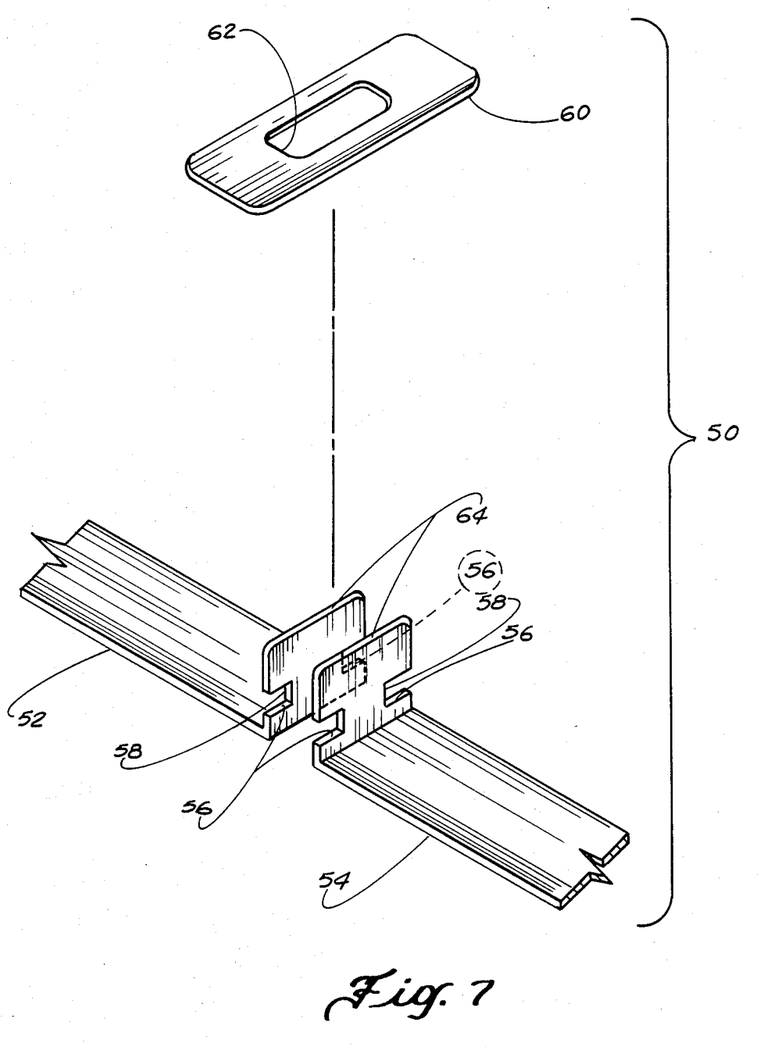
FIG. 7 is an exploded view of another form of fastening means.
Figure 8:
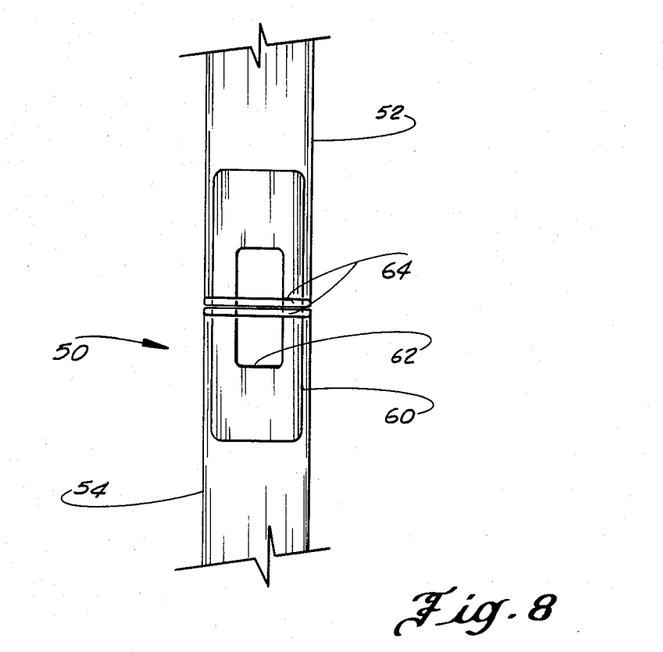
FIG. 8 is a plan view of the fastening means shown in FIG. 7 partially fastened.
Figure 9:
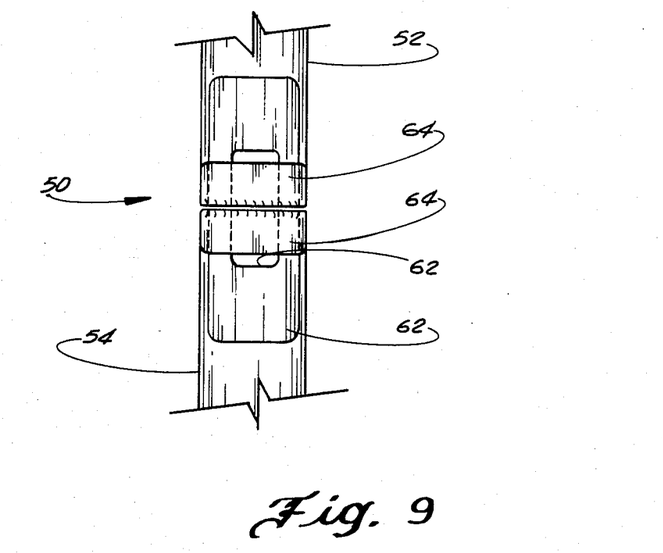
FIG. 9 is a plan view of the fastening means shown in FIG. 7 in fastened position.

Modified fastening means 50 shown in FIGS. 7, 8 and 9 includes tabs 52 and 54 each having notches 56 in their outwardly extending ends to provide necks 58 and retainer 60 each having slot 62 therein. Slot 62 is sufficiently long to pass over the ends 64 of tabs 52 and 54 and is sufficiently wide to be rotated as shown in FIG. 8 with necks 58 therein and ends 64 above washer 60. Thereafter, ends 64 above retainer 60 are separated and deformed onto retainer 60 as shown in FIG. 9 to lock it in place.

Figure 10:
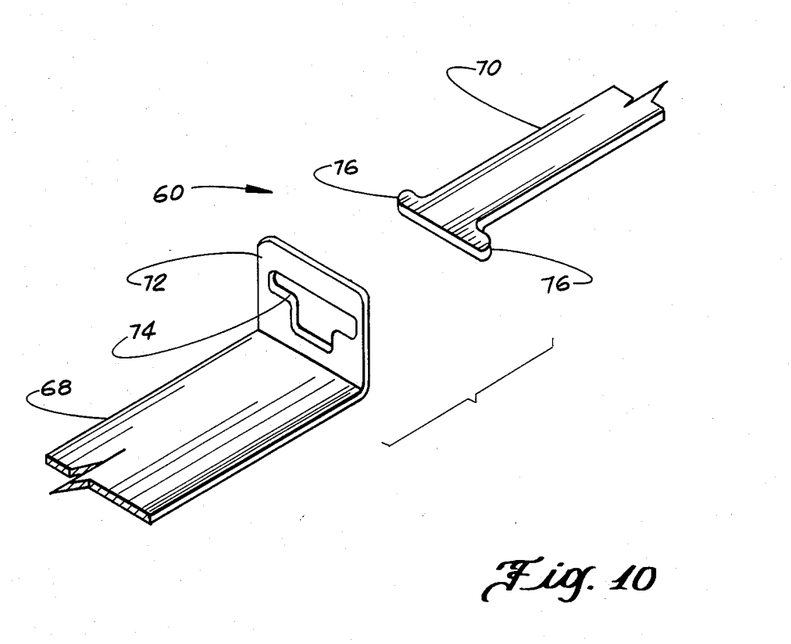
FIG. 10 is an isometric view of still another form of fastening means.
Figure 11:
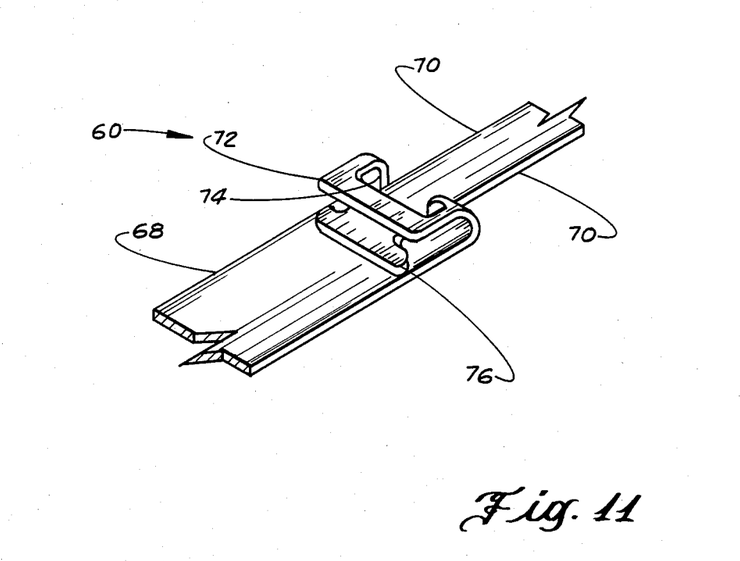
FIG. 11 is an isometric view of the fastening means shown in FIG. 10 in fastened position.

Modified fastening means 66 shown in FIGS. 10 and 11 includes end tabs 68 and 70. Tab 68 has its end 72 bent outward and includes T-slot 74. Tab 70 has ears 76 on its end. The width of ears 76 is slightly less than the width of the top of T-slot 74 and the width of tab 70 is slightly less than the width of the bottom of T-slot 74. Tab 70 is inserted through the top of T-slot 74, then moved into the lower portion of T-slot 74 and then end 72 of tab 68 is bent onto tab 70 as shown in FIG. 11.

What is claimed is:

1. An insulator assembly for covering a hollow structural member comprising:
    a pair of insulator segments,
    each of said segments having an internal shape to fit over a portion of the structural member which is to be covered and having straight longitudinal edges and parallel transverse ends,
    said segments when placed on the structural member having said longitudinal edges adjacent one another,
    at least one of said adjacent longitudinal edges of said segments including a recess,
    anchor bands secured in each of said segments and having end tabs extending into said recess, and
    said end tabs including notches at a position spaced from their ends, and
    a flat retainer having a central opening and a thickness less than the width of said notches, with one dimension of the central opening being larger than the width of said end tabs and with a second dimension of the central opening smaller than the width of said end tabs and slightly larger than the width between said notches,
    said retainers being placed over said tab ends in said recesses and rotated to engage in said notches to secure said anchor band end tabs together.

2. An insulator assembly according to claim 1 including a plug of insulating material in each of said recesses.

3. An insulator assembly according to claim 1 wherein said structural member is a truncated triangular pipe.

4. An insulator assembly according to claim 1 wherein said structural member is a tubular pipe.

5. An insulator assembly for covering a hollow structural member comprising:
    a pair of insulator segments,
    each of said segments having an internal shape to fit over a portion of the structural member which is to be covered and having straight longitudinal edges and parallel transverse ends,
    said segments when placed on the structural member having said longitudinal edges adjacent one another,
    at least one of said adjacent longitudinal edges of said segments including a recess,
    anchor bands secured in each of said segments and having end tabs extending into said recess, and
    a T-slot in one end of each of said anchor bands and ears on each side of the other end whereby the ears can be inserted through the wide portion of the T-slot with the band then positioned in the leg of the T-slot and the T-slotted end of the band deformed to retain the engagement between the band ends.

6. An insulator assembly according to claim 5 including a recess in each of said longitudinal edges positioned to register with each other in adjacent mating edges and form a composite recess sufficiently large to receive said retainer.

7. A support member according to claim 5 including a plug of insulating material in each of said recesses.

8. A support member according to claim 5 wherein said structural member is a truncated triangular pipe.

9. A support member according to claim 5 wherein said structural member is a tubular pipe.

* * * * *